US011914278B2

(12) United States Patent
Yamamoto

(10) Patent No.: US 11,914,278 B2
(45) Date of Patent: Feb. 27, 2024

(54) PRISM BLOCK AND PROJECTION DISPLAY APPARATUS

(71) Applicant: Panasonic Intellectual Property Management Co., Ltd., Osaka (JP)

(72) Inventor: Norikazu Yamamoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/734,530

(22) Filed: May 2, 2022

(65) Prior Publication Data

US 2022/0382140 A1 Dec. 1, 2022

(30) Foreign Application Priority Data

May 28, 2021 (JP) ................................ 2021-090240

(51) Int. Cl.

*G03B 33/12* (2006.01)
*G03B 21/00* (2006.01)
*G03B 21/20* (2006.01)

(52) U.S. Cl.

CPC .......... *G03B 33/12* (2013.01); *G03B 21/008* (2013.01); *G03B 21/204* (2013.01)

(58) Field of Classification Search

CPC ..... G03B 33/12; G03B 21/008; G03B 21/204
USPC ........................................................ 353/33
See application file for complete search history.

(56) References Cited

U.S. PATENT DOCUMENTS 6,992,830 B1 * 1/2006 Mitchell ............ G02B 27/1033 359/601
2015/0042564 A1 2/2015 Shiina et al.

FOREIGN PATENT DOCUMENTS

JP 2013-218262 10/2013
JP 2017-227747 12/2017
JP 2020-64206 4/2020
JP 2020-91342 6/2020
JP 2020-122874 8/2020

* cited by examiner

*Primary Examiner* — Jerry L Brooks
(74) *Attorney, Agent, or Firm* — Wenderoth, Lind & Ponack, L.L.P.

(57) ABSTRACT

A prism block includes a first prism having first, second and third surfaces, a second prism having a fourth surface parallel to the first surface, a fifth surface facing the second surface, and a sixth surface, a third prism having seventh and eight surfaces respectively facing the second and fifth surfaces, and an optical path separation coating disposed between the fifth and eighth surfaces. Illumination light incident on the third surface is reflected by the second surface, and is emitted from the first surface. Projection light incident on the first surface is emitted from the fourth surface. Imaging light incident on the fourth surface is reflected by the optical path separation coating, and is emitted from the sixth surface. A projection axis plane including optical paths of the illumination light and the projection light, and an imaging axis plane including an optical path of the imaging light intersect each other.

14 Claims, 12 Drawing Sheets

300
100
201
202
203
204
205
206
207
208
209
210
211
212
213
214
215
Welcome
Im1
200
60
20
Ln1
10
50
Ln2
1
30
Pn1
Sn1
X
Y
Z 1
10
13
12
PA1
40
22
32
Pn1
21
20
Ln1
50
31
Sp
30
Ln2
11
Z
Y
X 1
40
22
30
10
32
21
11
31
Sn1
IA1
20
12
Sp
23
70
Z
Y
X 300A
100A
201A
201B
202A
202B
203A
203B
204A
204B
206
207
208A
209A
210
212
213
214
215
216
10
20
30
52
54
60
200
Pn3
Sn3
Ln5
Ln6
X
Y
Z

PRISM BLOCK AND PROJECTION DISPLAY APPARATUS

BACKGROUND

1. Technical Field

The present disclosure relates to a prism block and a projection display apparatus.

2. Description of the Related Art

In the related art, a projection display apparatus that projects an image on a projection target such as a screen or a building has been known. In the projection display apparatus of the related art, in order to check a positional relationship (distortion) between the projection target and a projected image, it is considered that the image projected on the projection target is captured and a projection position is adjusted based on the captured image.

Thus, a projection display apparatus incorporating an imaging element has been studied. For example, Patent Literature (PTL) 1 discloses a projector including a TIP prism that reflects light from a light source, guides the light to a light modulation element, transmits the light reflected by the light modulation element, and outputs the light to a projection optical system. In the projector described in PTL 1, the light incident on the TIR prism from the projection optical system forms an image by the imaging element disposed in a reflection direction of the TIR prism.

PTL 1 described above is Unexamined Japanese Patent Publication No. 2013-218262.

SUMMARY

The projector described in PTL 1 still has room for improvement in terms of reducing stray light to the imaging element.

The present disclosure provides a prism block and a projection display apparatus capable of reducing stray light to an imaging element.

A prism block according to the present disclosure includes a first prism that has a first surface, a second surface inclined with respect to the first surface, and a third surface connecting the first surface and the second surface, a second prism that is located on a side of the second surface of the first prism, and has a fourth surface parallel to the first surface, a fifth surface that is located on the side of the second surface with respect to the fourth surface, and is inclined in a direction different from an inclined direction of the second surface with respect to the first surface, and a sixth surface connecting the fourth surface and the fifth surface, a third prism that has a seventh surface facing the second surface via a gap and an eighth surface facing the fifth surface, and is located between the first prism and the second prism, and an optical path separation coating that is located between the fifth surface of the second prism and the eighth surface of the third prism. Illumination light incident on the third surface of the first prism is reflected by the second surface, and is emitted from the first surface, projection light incident on the first surface of the first prism is emitted from the fourth surface of the second prism via the third prism, imaging light incident on the fourth surface of the second prism is reflected by the optical path separation coating, and is emitted from the sixth surface, and a projection axis plane including optical paths of the illumination light and the projection light through which the illumination light and the projection light are incident on the first prism and are emitted from the second prism, and an imaging axis plane including an optical path of the imaging light through which the imaging light is incident on the fourth surface of the second prism and is emitted from the sixth surface intersect each other.

A projection display apparatus according to the present disclosure includes the prism block, a light source that is disposed on a side of the third surface of the first prism, and emits the illumination light, an image forming element that is disposed on a side of the first surface of the first prism, and generates an image, a projection lens unit that is disposed on a side of the fourth surface of the second prism, and an imaging element that is disposed on a side of the sixth surface of the second prism, and captures the imaging light.

According to the present disclosure, it is possible to provide a prism block and a projection display apparatus capable of reducing stray light to an imaging element.

DETAILED DESCRIPTIONS

Background to Present Disclosure

In a projection display apparatus, it is considered that a projection lens is used not only to project image light on a projection target but also to capture light from the projection target such as a screen. For example, in the projector described in PTL 1, the TIR prism that separates illumination light and projection light is also used to separate projection light and imaging light.

However, in the projector described in PTL 1, since an optical path of the image light and an optical path of the imaging light are shared, there is a problem that stray light in an optical path branch element is incident on the imaging element. When the stray light is incident on the imaging element, the stray light may affect the captured image.

Thus, the inventor of the present disclosure has studied a projection display apparatus that prevents stray light in an optical path branch element from being incident on an imaging element, and has reached the following invention.

Hereinafter, exemplary embodiments will be described in detail with reference to the drawings as appropriate. It is noted that a more detailed description than necessary may be omitted. For example, the detailed description of already well-known matters and the overlap description of substantially same configurations may be omitted. This is to avoid an unnecessarily redundant description below and to facilitate understanding of a person skilled in the art.

The accompanying drawings and the following description are provided for those skilled in the art to fully understand the present disclosure, and are not intended to limit the subject matter described in the scope of claims.

First Exemplary Embodiment

[1-1. Configuration of Projection Display Apparatus]

Figure 1:
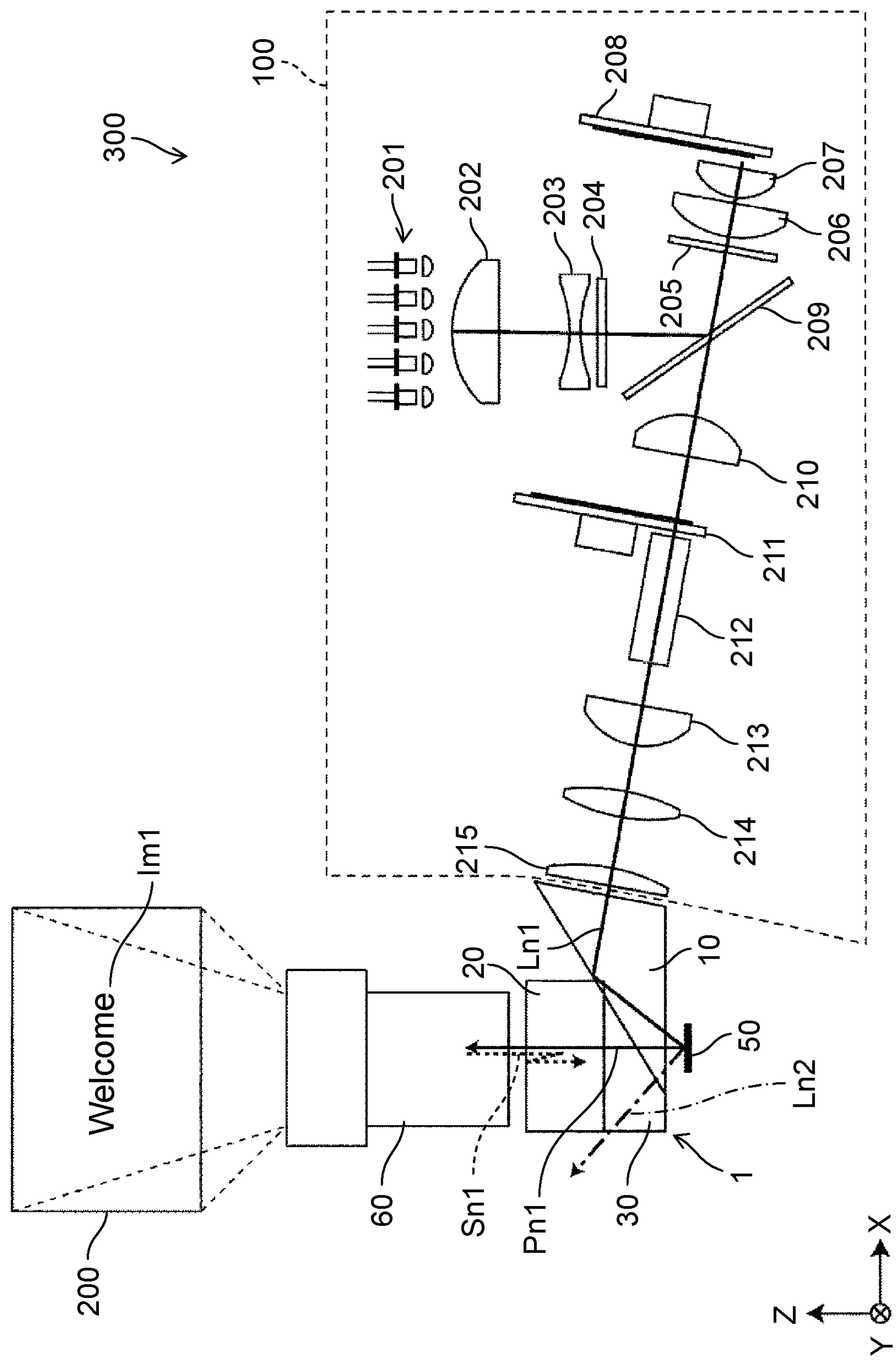
FIG. 1 is a diagram illustrating a configuration of a projection display apparatus according to a first exemplary embodiment.
Figure 2:
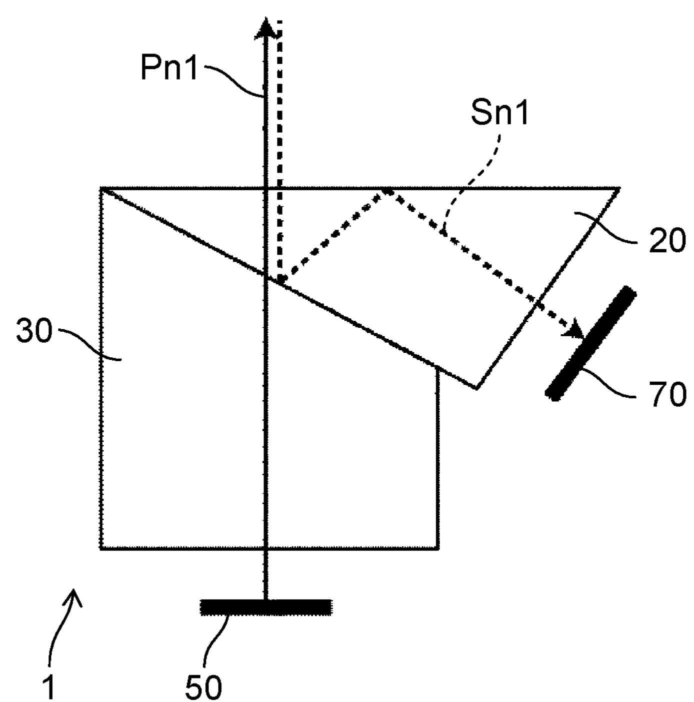
FIG. 2 is a diagram of a prism block included in the projection display apparatus of FIG. 1 as viewed from another direction.
Figure 2:
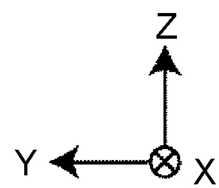

Projection display apparatus 300 according to a first exemplary embodiment will be described with reference to FIGS. 1 and 2. FIG. 1 is a diagram illustrating a configuration of projection display apparatus 300 according to the first exemplary embodiment. FIG. 2 is a diagram of prism block 1 included in projection display apparatus 300 of FIG. 1 as viewed from another direction.

As illustrated in FIGS. 1 and 2, projection display apparatus 300 is a device that includes prism block 1, light source 100, DMD 50 that is an image forming element, projection lens unit 60, and imaging element 70, and projects an image on screen 200 and captures the image projected on screen (projection target) 200. In projection display apparatus 300, light from light source 100 is incident on prism block 1, is reflected by DMD 50, is emitted from projection lens unit 60 via prism block 1, and is projected on screen 200.

In light source 100, light is emitted from semiconductor laser 201. Semiconductor laser 201 emits blue light with a wavelength of, for example, 456 nm as a center. A polarization state of the light emitted from semiconductor laser 201 is aligned to be S-polarization.

The blue light emitted from semiconductor laser 201 is transmitted through convex lens 202 and concave lens 203, and passes through diffuser plate 204. Convex lens 202 and concave lens 203 are afocal lenses that re-collimate the light emitted from semiconductor laser 201. The light having passed through diffuser plate 204 passes through convex lens 202 and concave lens 203, is formed into collimated light having a desired light beam width, passes through diffuser plate 204, and reaches dichroic mirror 209.

Dichroic mirror 209 has characteristics of reflecting S-polarized blue light. Thus, the S-polarized blue light emitted from semiconductor laser 201 is reflected by dichroic mirror 209 and passes through ¼ wave plate 205. The light transmitted through ¼ wave plate 205 is converted into circularly polarized light when being transmitted through ¼ wave plate 205, is transmitted through condenser lenses 206 and 207, and is substantially formed as an image by phosphor wheel 208 while being gradually concentrated.

Phosphor wheel 208 is formed by, for example, providing a phosphor layer in which a cutout is formed on a surface of a circular aluminum substrate. A rotation motor is disposed in a central portion of the aluminum substrate, and phosphor wheel 208 can be rotated. For example, the phosphor layer is excited by blue light, and is formed by applying a YAG phosphor that emits yellow light containing green and red wavelength components. The cutout portion of the phosphor layer is formed to reflect blue light. The light substantially formed as the image by the phosphor layer of phosphor wheel 208 is reflected as yellow light, and the light formed as the image by the cutout portion is reflected as blue light. By the rotation of phosphor wheel 208, yellow light and blue light are emitted from phosphor wheel 208 in a time-division manner.

The light reflected by phosphor wheel 208 is transmitted through condenser lenses 206 and 207. Since the blue light is circularly polarized light, the blue light is converted into P-polarized light by ¼ wave plate 205, and since the yellow light is unpolarized light, the yellow light passes through the ¼ wave plate, is transmitted, as the unpolarized light, through dichroic mirror 209, is transmitted through condenser lens 210, and is transmitted through color wheel 211.

For example, color wheel 211 is formed by dividing a plurality of color filters into segments on a surface of a disk-shaped glass plate. The color filter is, for example, a dielectric multi-layer coating, and is divided into transparent, red, and green segments.

Of the light incident on color wheel 211, yellow light is transmitted through all the segments of the color filter, and blue light is transmitted only through the transparent segment. Of the yellow light from phosphor wheel 208, the light transmitted through the transparent segment of the color filter is emitted as yellow light from color wheel 211, the light transmitted through the red segment is emitted as red light from the color wheel, and the light transmitted through the green segment is emitted as green light from the color wheel. The blue light from phosphor wheel 208 is transmitted through the transparent segment of the color filter and is emitted as blue light from color wheel 211.

A rotation motor is disposed at a central portion of the disk-shaped glass plate, and color wheel 211 can be rotated. By the rotation of color wheel 211, blue, yellow, red, and green light rays are emitted from color wheel 211 in a time-division manner.

The light transmitted through color wheel 211 is incident on rod integrator 212, and is incident, as illumination light Ln1, on prism block 1 via relay optical systems 213, 214, and 215. Details of prism block 1 will be described later.

Illumination light Ln1 incident on prism block 1 reaches DMD 50 which is the image forming element. In the present exemplary embodiment, the image forming element includes a single digital micromirror device (DMD).

Projection display apparatus 300 generates projection light Pn1 having different light intensities by modulating DMD 50 based on a control signal such as an image signal. DMD 50 includes a plurality of movable micromirrors. Each micromirror corresponds to one pixel of the image. DMD 50 divides the light into projection light Pn1 (DMD-ON light) directed to projection lens unit 60 and illumination light Ln2 (DMD-OFF light) not incident on projection lens unit 60 by changing an angle of the micromirror based on the control signal.

Projection light Pn1 (DMD-ON light) projected as an image is reflected by DMD 50, is incident on prism block 1 again, is incident on projection lens unit 60, and is then projected on screen 200. Illumination light Ln2 (DMD-OFF light) that is not projected as an image is not incident on projection lens unit 60, but is transmitted through prism block 1.

Projection lens unit 60 includes a plurality of lenses, and enlarges projection light Pn1 emitted from prism block 1 and projects the enlarged projection light on screen 200. Illumination light Ln1 from light source 100 is reflected as the DMD-ON light (projection light Pn1) by DMD 50, reaches screen 200 via projection lens unit 60, and is perceived as full-color image Im1. The image includes both a still image and a moving image.

Imaging light Sn1 including projection light Pn1 reflected by screen 200 is incident on prism block 1, is reflected inside prism block 1, and is received by imaging element 70 as illustrated in FIG. 2.

[1-2. Configuration of Prism Block]

Figure 3:
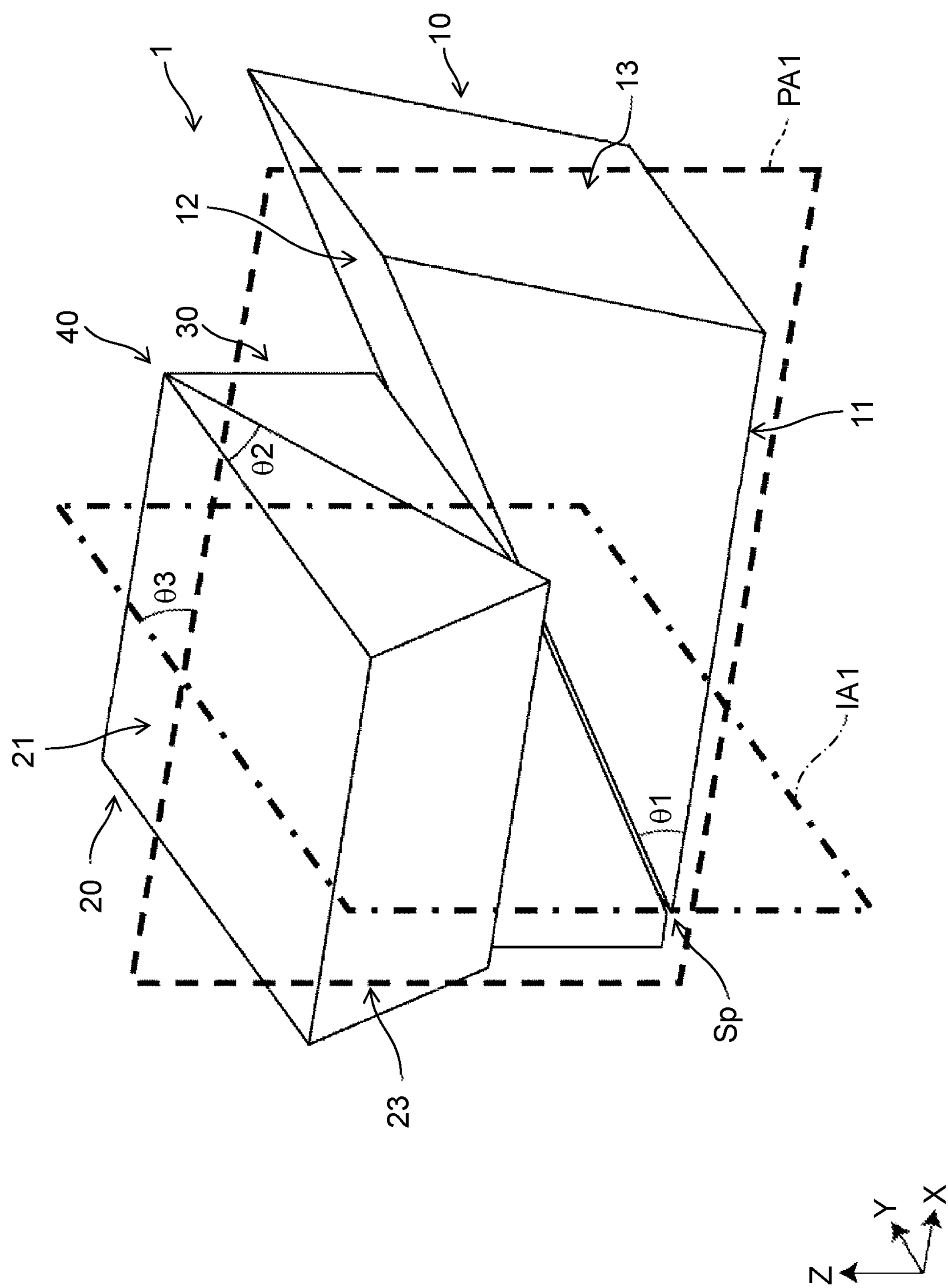
FIG. 3 is a perspective view illustrating a prism block according to the first exemplary embodiment.
Figure 4:
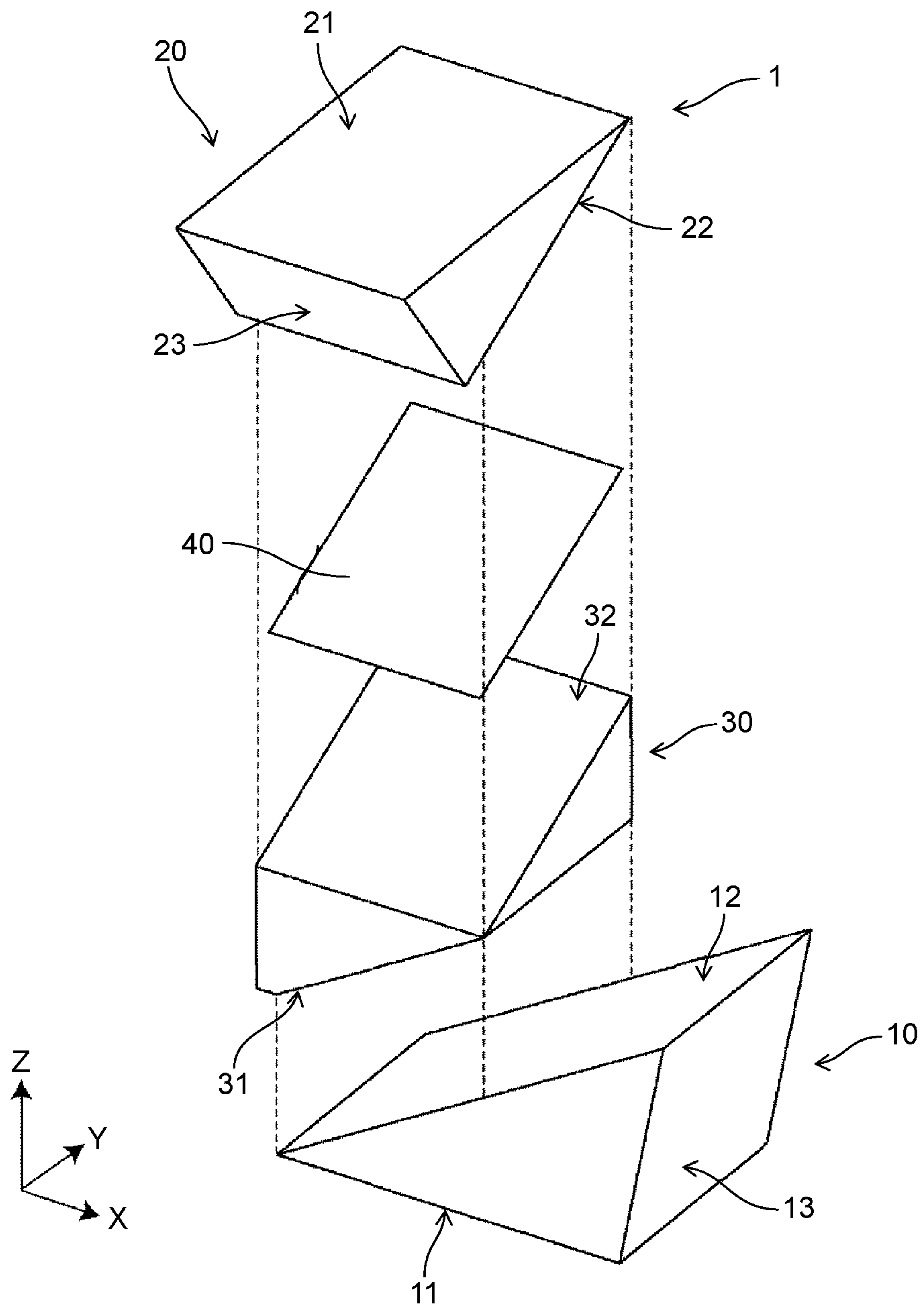
FIG. 4 is an exploded perspective view of the prism block of FIG. 3.

FIG. 3 is a perspective view illustrating prism block 1 according to the first exemplary embodiment. FIG. 4 is an exploded perspective view of prism block 1 of FIG. 3.

As illustrated in FIGS. 3 and 4, prism block 1 includes first prism 10, second prism 20, third prism 30, and optical path separation coating 40. Prism block 1 plays a role of totally internally reflecting illumination light Ln1 from light source 100 and emitting the illumination light to DMD 50, and a role of separating an optical path of projection light Pn1 from DMD 50 from an optical path of imaging light Sn1 from screen 200.

First prism 10 includes first surface 11, second surface 12 inclined with respect to first surface 11, and third surface 13 that connects first surface 11 and second surface 12 and on which illumination light Ln1 is incident. In the present exemplary embodiment, first prism 10 is a prism having a triangular prism shape. First surface 11 is disposed perpendicular to an optical axis of projection light Pn1 from DMD 50.

Second prism 20 includes fourth surface 21 disposed closer to second surface 12 of first prism 10 and parallel to first surface 11, fifth surface 22 positioned closer to second surface 12 than the fourth surface is and inclined in a direction different from second surface 12 with respect to first surface 11, and a sixth surface 23 connecting fourth surface 21 and fifth surface 22. In the present exemplary embodiment, second prism 20 is a prism having a triangular prism shape.

Third prism 30 is disposed between first prism 10 and second prism 20. Third prism 30 has seventh surface 31 facing second surface 12 via gap Sp, and eighth surface 32 facing fifth surface 22. Gap Sp between second surface 12 and seventh surface 31 is formed to have a size, for example, from 3 μm to 10 μm inclusive.

The arrangement of first surface 11 and second surface 12 of first prism 10, the arrangement of fourth surface 21 and fifth surface 22 of second prism 20, and the arrangement of seventh surface 31 and eighth surface 32 of third prism 30 when three directions perpendicular to each other are an X direction, a Y direction, and a Z direction will be described.

First surface 11 of first prism 10 is positioned on an XY plane extending in a +X direction and a +Y direction. Second surface 12 is inclined in a +Z direction with respect to first surface 11 and is positioned on an inclined plane extending between the +X direction and the +Z direction. Second surface 12 is inclined at inclination angle θ1 with respect to first surface 11. Inclination angle θ1 is an angle formed by first surface 11 and second surface 12, and may be from 28 degrees to 35 degrees inclusive. It is preferable that third surface 13 is disposed such that an incident direction of illumination light Ln1 is perpendicular (incident angle is 0 degrees).

Fourth surface 21 of the second prism is positioned in the +Z direction with respect to first surface 11 of first prism 10, and is positioned on a plane parallel to first surface 11. Fifth surface 22 is positioned on an inclined plane that is inclined in a −Z direction from fourth surface 21 and extends between a −Y direction and the −Z direction. Fifth surface 22 is inclined at inclination angle θ2 with respect to fourth surface 21. Inclination angle θ2 is an angle formed by fourth surface 21 and fifth surface 22, and may be from 25 degrees to 32 degrees inclusive.

Since first surface 11 of first prism 10 and fourth surface 21 of second prism 20 are arranged in parallel, fifth surface 22 of second prism 20 is also inclined with respect to first surface 11 of first prism 10. Fifth surface 22 of second prism 20 is inclined with respect to first surface 11 in a direction different from second surface 12.

Seventh surface 31 of third prism 30 is positioned in the +Z direction with respect to second surface 12 of first prism 10. Gap Sp is formed between second surface 12 and seventh surface 31. Seventh surface 31 is positioned on an inclined plane facing second surface 12, that is, an inclined plane extending between the +X direction and the +Z direction. Eighth surface 32 of third prism 30 is positioned in the −Z direction with respect to fifth surface 22 of second prism 20. Fifth surface 22 and eighth surface 32 are bonded via optical path separation coating 40. Eighth surface 32 is positioned on an inclined plane facing fifth surface 22, that is, an inclined plane extending between the −Y direction and the −Z direction.

Optical path separation coating 40 is disposed between fifth surface 22 of second prism 20 and eighth surface 32 of third prism 30. Optical path separation coating 40 includes, for example, a partial reflection mirror such as a half mirror that reflects a part of light incident on prism block 1 and transmits the remaining light.

Figure 5:
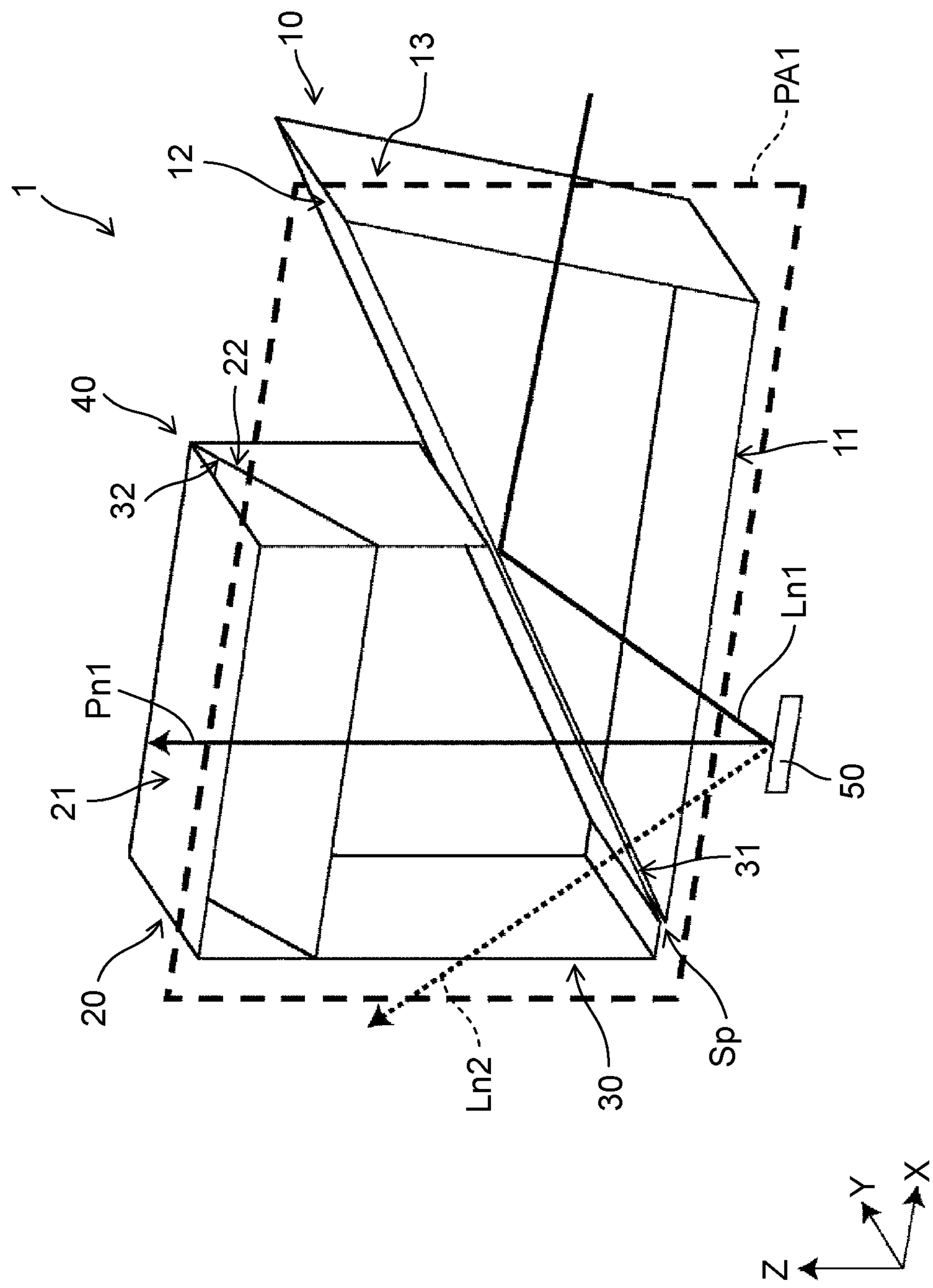
FIG. 5 is a cross-sectional view illustrating a projection axis plane of the prism block of FIG. 3.

FIG. 5 is a cross-sectional view illustrating projection axis plane PA1 of prism block 1 of FIG. 3. Optical paths of illumination light Ln1 and projection light Pn1 inside prism block 1 will be described with reference to FIG. 5.

Illumination light Ln1 from light source 100 is incident on third surface 13 of first prism 10, is reflected by second surface 12, is emitted from first surface 11, and reaches DMD 50. Projection light Pn1 (DMD-ON light) reflected by DMD 50 is incident on first surface 11 of first prism 10, and is emitted from second prism 20 via third prism 30. More specifically, illumination light Ln1 from light source 100 is incident on third surface 13 of first prism 10, is reflected by second surface 12, is emitted from first surface 11, is reflected by image forming element (DMD) 50, and is incident, as projection light Pn1, on first prism 10 again. Since gap Sp is formed between second surface 12 of first prism 10 and seventh surface 31 of third prism 30 facing second surface 12, illumination light Ln1 is totally internally reflected by second surface 12 of first prism 10. The total internal reflection means that illumination light Ln1 incident on first prism 10 is not transmitted from second surface 12 of first prism 10 to the outside but is totally reflected by second surface 12.

Projection light Pn1 (DMD-ON light) reflected by DMD 50 is incident on first prism 10 again from first surface 11, is emitted from fourth surface 21 of second prism 20 via third prism 30, and is projected on screen 200 via projection lens unit 60. Illumination light Ln2 (DMD-OFF light) that is not projected as an image reflected by DMD 50 is not incident on projection lens unit 60, but is output from prism block 1 to the outside.

Figure 6:
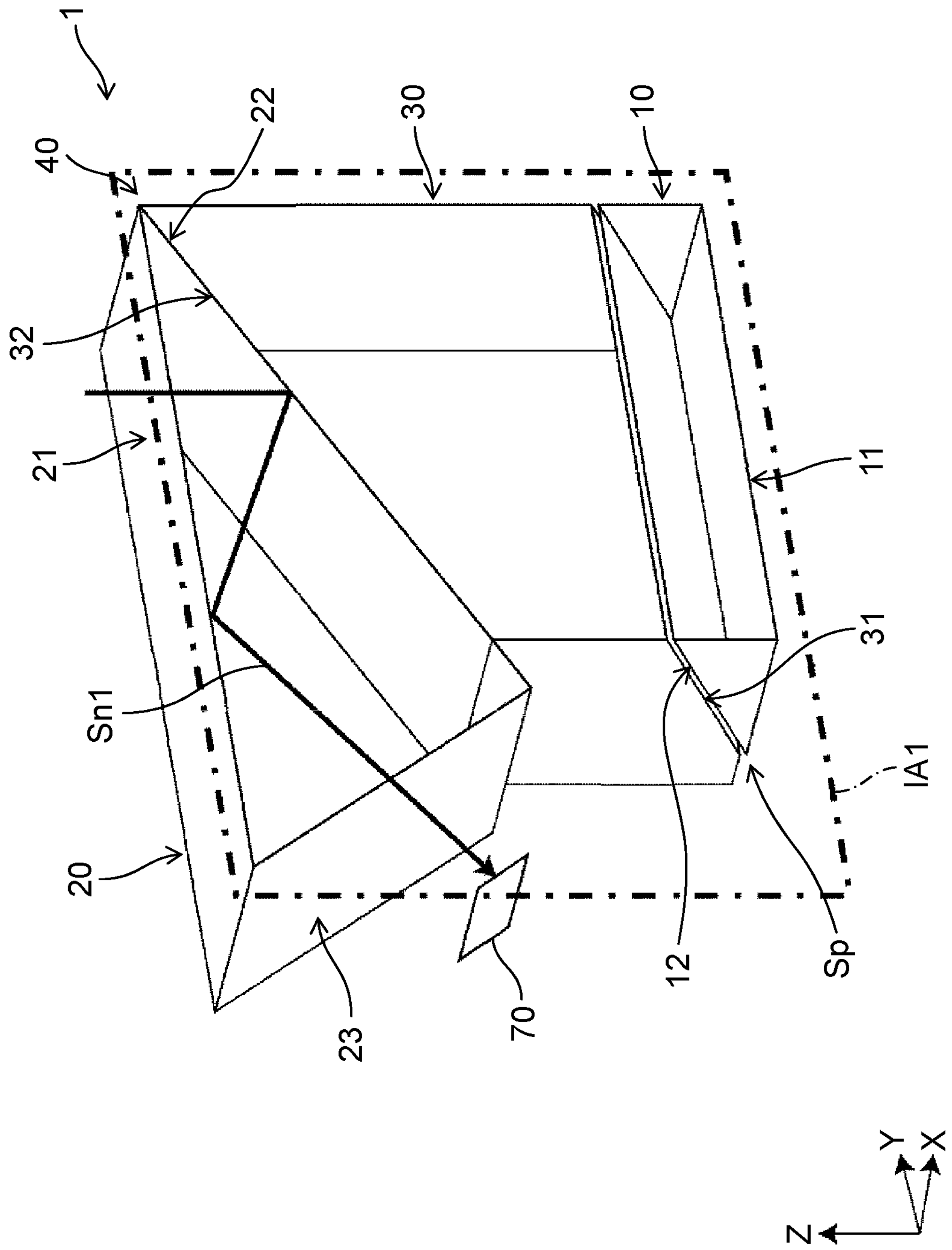
FIG. 6 is a cross-sectional view illustrating an imaging axis plane of the prism block of FIG. 3.

As illustrated in FIG. 5, the optical paths of illumination light Ln1, projection light Pn1 (DMD-ON light), and illumination light Ln2 (DMD-OFF light) are included in projection axis plane PAL The optical path of illumination light Ln1 is a path of light through which illumination light Ln1 from light source 100 is incident on third surface 13 of first prism 10 and reaches DMD 50. The optical path of projection light Pn1 is a path of light through which light that is reflected by DMD 50, is incident on first prism 10, and is emitted from fourth surface 21 of second prism 20 via third prism 30. The optical path of illumination light Ln2 (DMD-OFF light) reflected by DMD 50 is also included in projection axis plane PAL FIG. 6 is a cross-sectional view illustrating imaging axis plane IA1 of prism block 1 of FIG. 3. An optical path of imaging light Sn1 inside prism block 1 will be described with reference to FIG. 6.

Imaging light Sn1 is light including projection light Pn1 reflected by screen 200. Imaging light Sn1 is incident on fourth surface 21 of second prism 20 via projection lens unit 60, is reflected by optical path separation coating 40, is totally internally reflected by fourth surface 21, is emitted from sixth surface 23, and is received by imaging element 70 disposed near sixth surface 23.

As illustrated in FIG. 6, the optical path of imaging light Sn1 is included in imaging axis plane IA1. The optical path of imaging light Sn1 is a path of light through which imaging light Sn1 reflected by screen 200 is incident on fourth surface 21 of second prism 20 and is emitted from sixth surface 23.

As illustrated in FIG. 3, projection axis plane PA1 and imaging axis plane IA1 intersect each other. When projection axis plane PA1 and imaging axis plane IA1 intersect each other, stray light due to projection light Pn1 (DMD-ON light) and illumination light Ln2 (DMD-OFF light) hardly enters imaging axis plane IA1. Thus, the stray light incident on imaging element 70 can be reduced.

As an intersection angle between projection axis plane PA1 and imaging axis plane IA1, that is, intersection angle θ3 (see FIG. 3) between projection axis plane PA1 and imaging axis plane IA1 increases, the stray light entering imaging element 70 attenuates. Intersection angle θ3 is an angle formed by projection axis plane PA1 and imaging axis plane IA1 as viewed from the Z direction. Thus, intersection angle θ3 between projection axis plane PA1 and imaging axis plane IA1 may be from 45 degrees to 135 degrees inclusive. More preferably, projection axis plane PA1 and imaging axis plane IA1 may be perpendicular to each other. In the present exemplary embodiment, projection axis plane PA1 is positioned in an XZ plane, imaging axis plane IA1 is positioned in a YZ plane, and projection axis plane PA1 and imaging axis plane IA1 are perpendicular to each other.

In the present exemplary embodiment, prism block 1 plays roles of a TIR prism (total internal reflection prism) that totally internally reflects illumination light Ln1 and emits the illumination light toward DMD 50, and an optical path separation prism that separates the optical path of imaging light Sn1 from the optical path of projection light Pn1. The TIR prism and the optical path separation prism are formed by one prism block 1, and thus, prism block 1 can be thinned. Thus, projection display apparatus 300 can be downsized.

[1-3. Effects and the Like]

According to the above-described exemplary embodiment, projection axis plane PA1 and imaging axis plane IA1 intersect each other. Thus, reflected light inside prism block 1 of illumination light Ln2 (DMD-OFF light) that is not projected as the image reflected by DMD 50 can be prevented from entering imaging element 70. Thus, the stray light incident on imaging element 70 can be reduced.

Prism block 1 is obtained by forming the TIR prism and the optical path separation prism as one prism block. Thus, prism block 1 can be thinned as compared with a case where the TIR prism and the optical path separation prism are separately provided. Accordingly, projection display apparatus 300 can be downsized.

Optical path separation coating 40 is provided between second prism 20 and third prism 30, and thus, the optical path of projection light Pn1 and the optical path of imaging light Sn1 are separated. Thus, attenuation when illumination light Ln1 is incident on DMD 50 can be reduced, and the light amount of projection light Pn1 projected on screen 200 can be increased.

Imaging light Sn1 incident on prism block 1 is reflected by optical path separation coating 40, is totally internally reflected by fourth surface 21 inside second prism 20, and is incident on imaging element 70. Thus, the stray light incident on imaging element 70 can be reduced.

In the above-described exemplary embodiment, the example in which optical path separation coating 40 is the partial reflection mirror has been described, but the present disclosure is not limited thereto. Optical path separation coating 40 may be, for example, a polarization separation coating. The polarization separation coating is a coating that transmits light in a first polarization state of one of P-polarization and S-polarization and reflects light in a second polarization state of the other of the P-polarization and the S-polarization. In this case, projection light Pn1 has the first polarization state or the second polarization state.

Second Exemplary Embodiment

A second exemplary embodiment will be described with reference to FIGS. 7 to 9. In the second exemplary embodiment, the same or equivalent configurations as those in the first exemplary embodiment are denoted by the same reference numerals as those in the first exemplary embodiment. The description already given for the first exemplary embodiment is omitted for the second exemplary embodiment.

Figure 7:
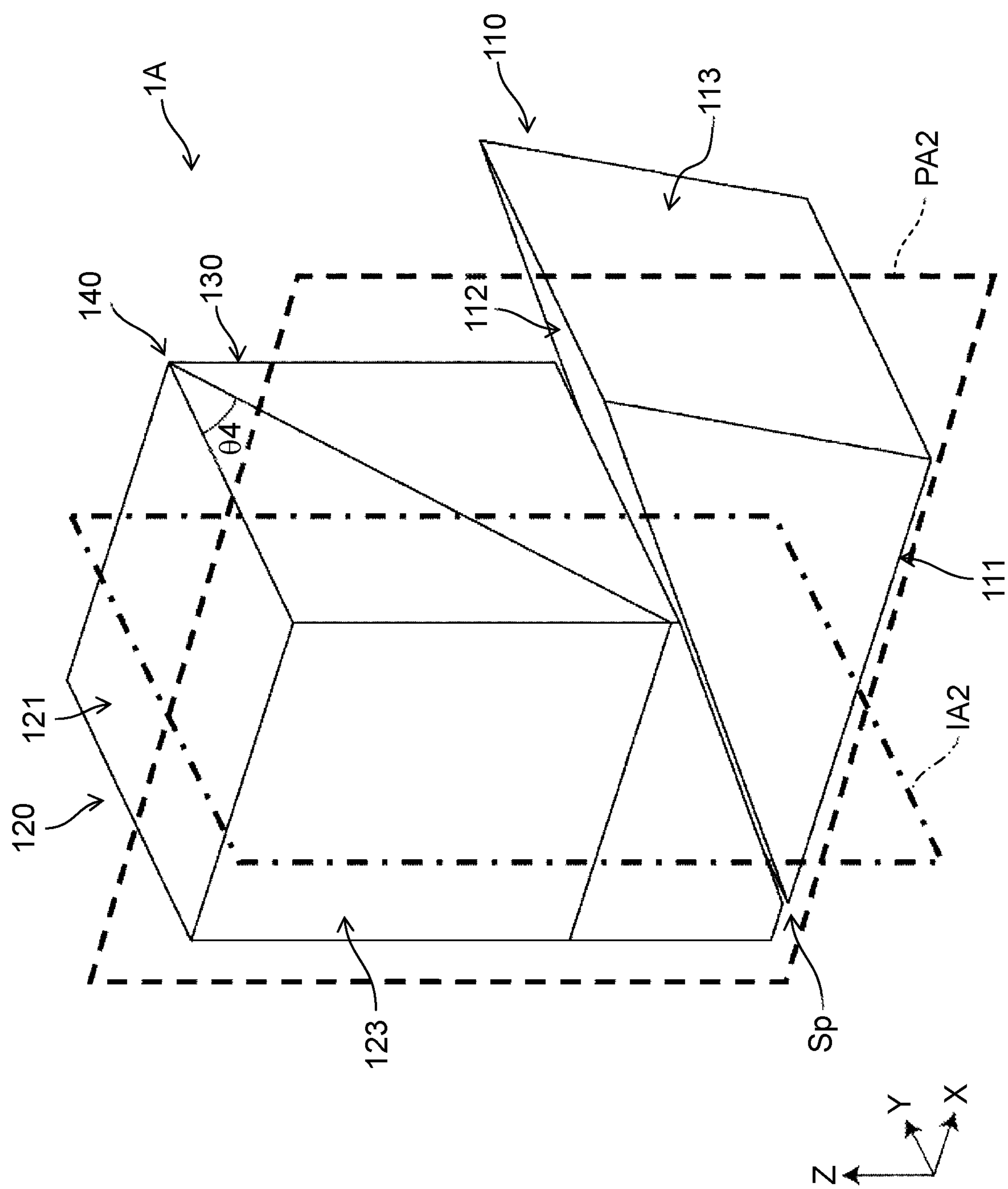
FIG. 7 is a perspective view illustrating a prism block according to a second exemplary embodiment.

FIG. 7 is a perspective view illustrating prism block 1A according to the second exemplary embodiment. FIG. 8 is a cross-sectional view illustrating projection axis plane PA2 of prism block 1A of FIG. 7. FIG. 9 is a cross-sectional view illustrating imaging axis plane IA2 of prism block 1A of FIG. 7.

In the second exemplary embodiment, as illustrated in FIG. 7, a shape of second prism 120 is different from that in the first exemplary embodiment, and accordingly, a shape of third prism 130 is also different from that in the first exemplary embodiment. Specifically, second prism 120 is formed such that inclination angle θ4 between fourth surface 121 and fifth surface 122 is larger than inclination angle θ2 described in the first exemplary embodiment. In the present exemplary embodiment, inclination angle θ4 is 45 degrees. Thus, imaging light Sn2 is received by imaging element 70 without being totally internally reflected by second prism 120 after being reflected by optical path separation coating 40.

Figure 8:
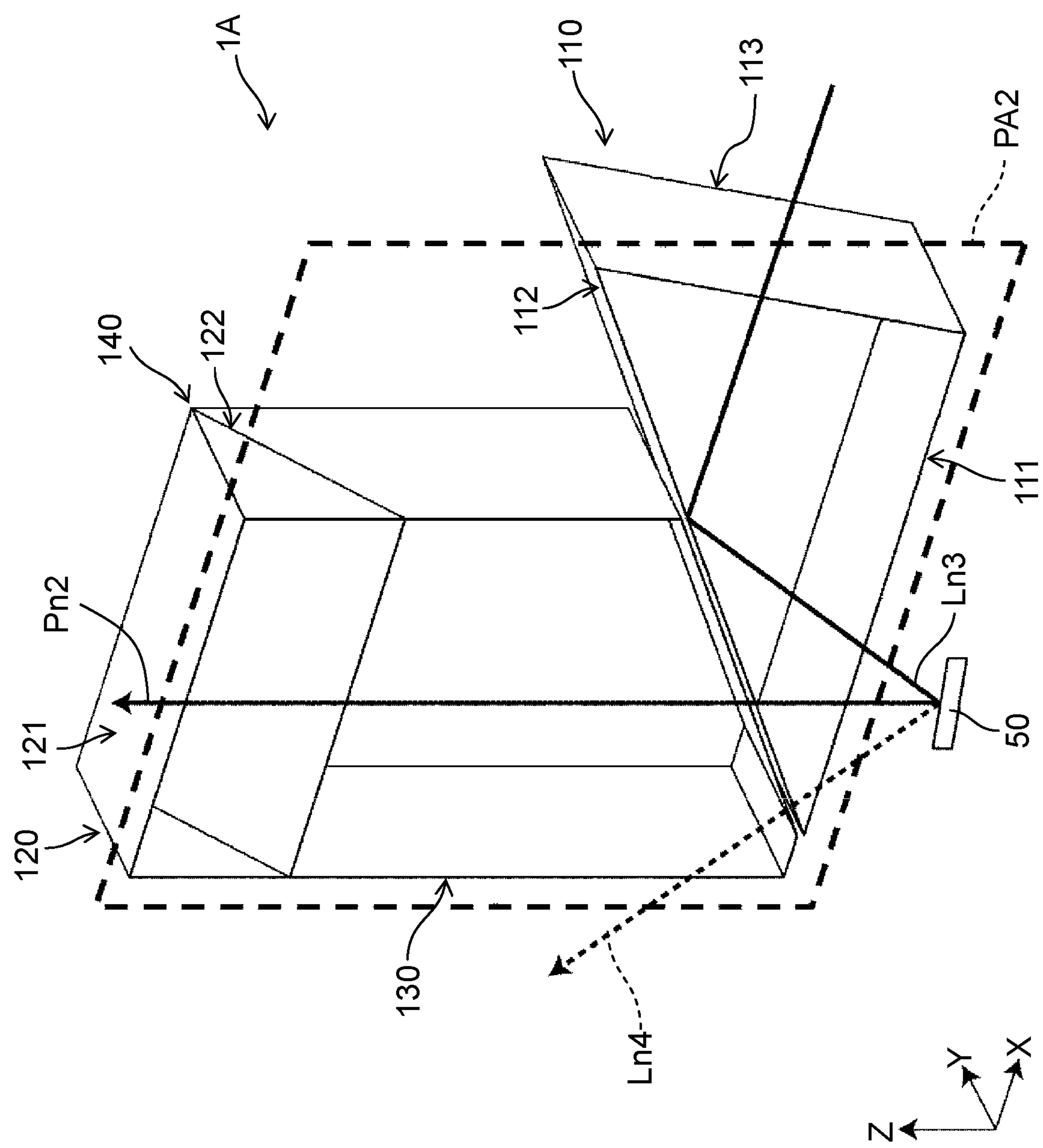
FIG. 8 is a cross-sectional view illustrating a projection axis plane of the prism block of FIG. 7.

As illustrated in FIG. 8, illumination light Ln3 from light source 100 is incident on third surface 113 of first prism 110, is totally internally reflected by second surface 112, and is emitted from first surface 111 toward DMD 50. Projection light Pn2 (DMD-ON light) reflected by DMD 50 is incident on first prism 110 again from first surface 111, is emitted from fourth surface 121 of second prism 120 via third prism 130, and is incident on projection lens unit 60.

Illumination light Ln4 (DMD-OFF light) that is not projected as an image reflected by DMD 50 is not incident on projection lens unit 60, but is output from prism block 1A to the outside.

Figure 9:
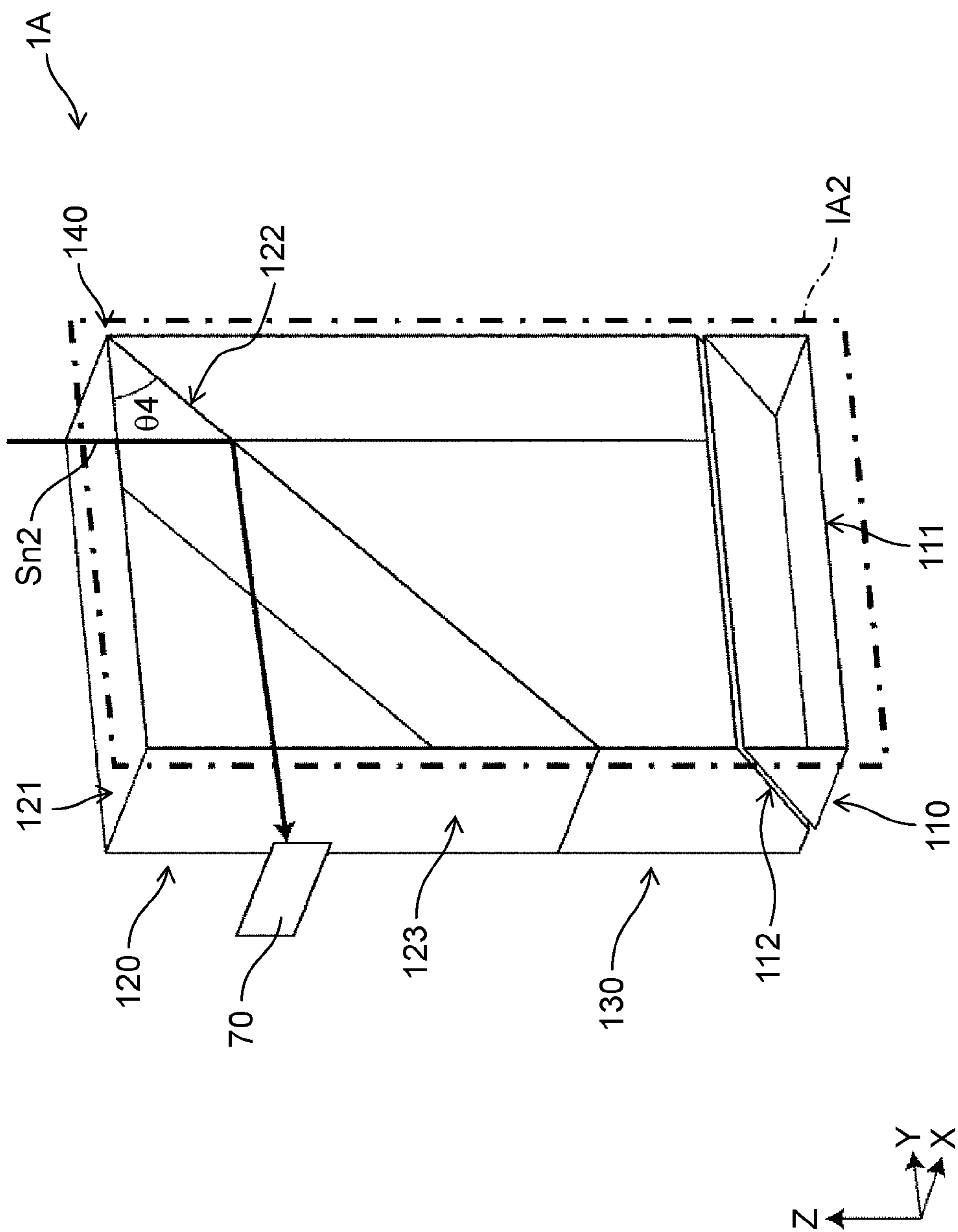
FIG. 9 is a cross-sectional view illustrating an imaging axis plane of the prism block of FIG. 7.

As illustrated in FIG. 9, imaging light Sn2 is incident on fourth surface 121 of second prism 120, is reflected by optical path separation coating 140, is emitted from sixth surface 123, and is received by imaging element 70. Unlike the first exemplary embodiment, since inclination angle θ4 between fourth surface 121 and fifth surface 122 is 45 degrees, imaging light Sn2 is incident on second prism 120 and is then emitted from sixth surface 123 by one reflection on optical path separation coating 140.

According to the above-described exemplary embodiment, even when the optical path of imaging light Sn2 inside second prism 120 is different, projection axis plane PA2 and imaging axis plane IA2 intersect each other, and thus, it is possible to reduce the entry of the stray light into imaging element 70.

Third Exemplary Embodiment

A third exemplary embodiment will be described with reference to FIGS. 10 to 12. In the third exemplary embodiment, the same or equivalent configurations as those in the first exemplary embodiment are denoted by the same reference numerals as those in the first exemplary embodiment. The description already given for the first exemplary embodiment is omitted for the third exemplary embodiment.

Figure 10:
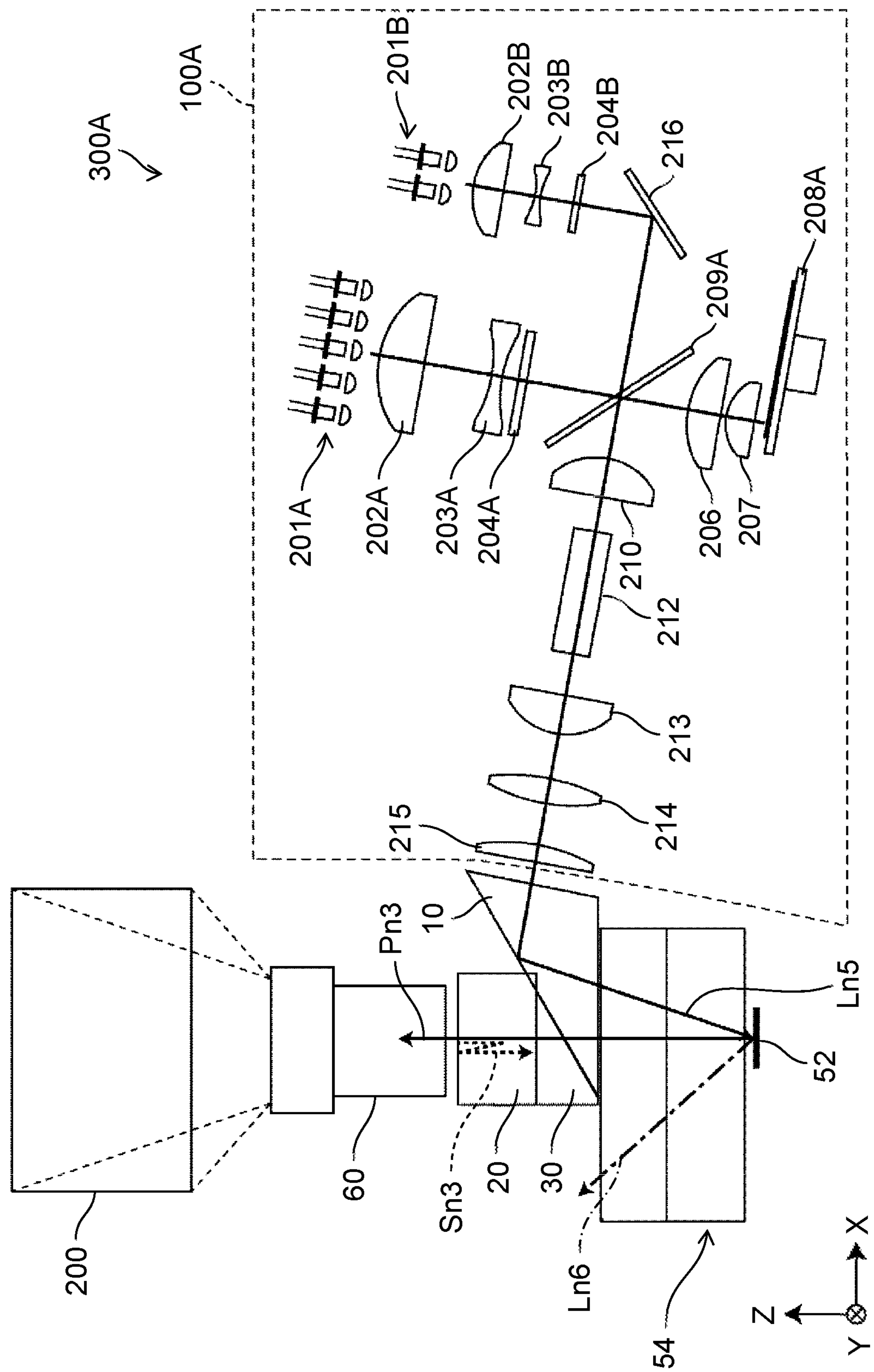
FIG. 10 is a schematic diagram illustrating a projection display apparatus according to a third exemplary embodiment.

FIG. 10 is a schematic diagram illustrating projection display apparatus 300A according to the third exemplary embodiment. FIG. 11 is a diagram of prism block 1 included in projection display apparatus 300A of FIG. 10 as viewed from another direction. FIG. 12 is a perspective view illustrating prism block 1 and color separating and combining prism 54 of FIG. 10.

The third exemplary embodiment is different from the first exemplary embodiment in that an image forming element includes three digital micromirror devices (DMDs) that modulate red, green, and blue light. As illustrated in FIG. 10, the image forming element includes DMD 51 that modulates blue light, DMD 52 that modulates green light, and DMD 53 that modulates red light. The third exemplary embodiment is different from the first exemplary embodiment in the configuration of light source 100A.

Figure 11:
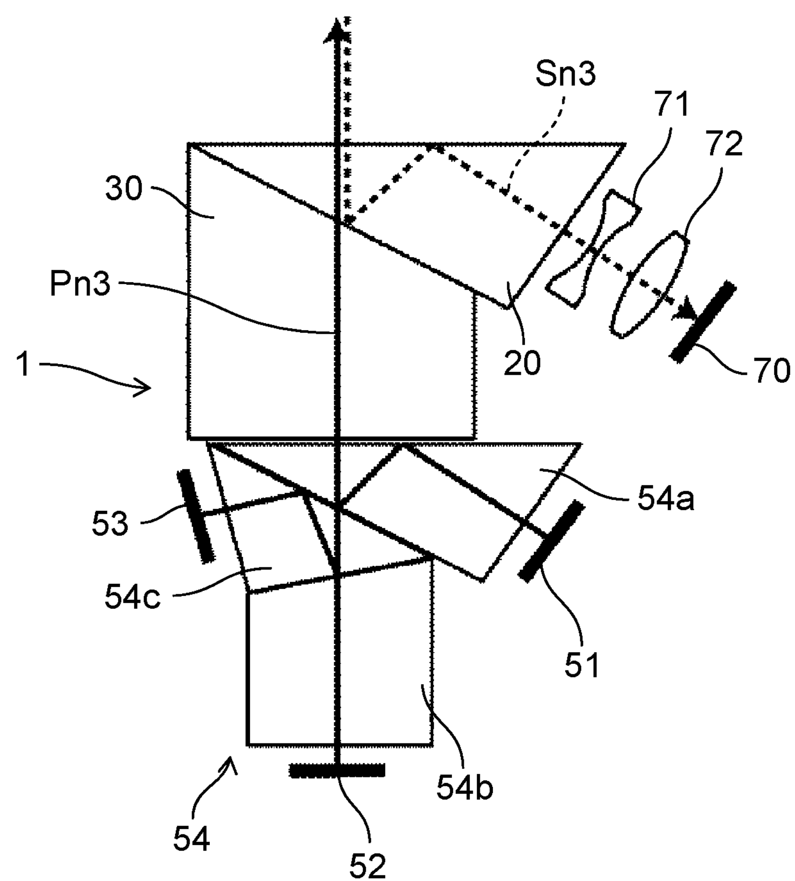
FIG. 11 is a diagram of a prism block included in the projection display apparatus of FIG. 10 as viewed from another direction.
Figure 11:
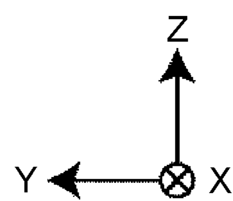
Figure 12:
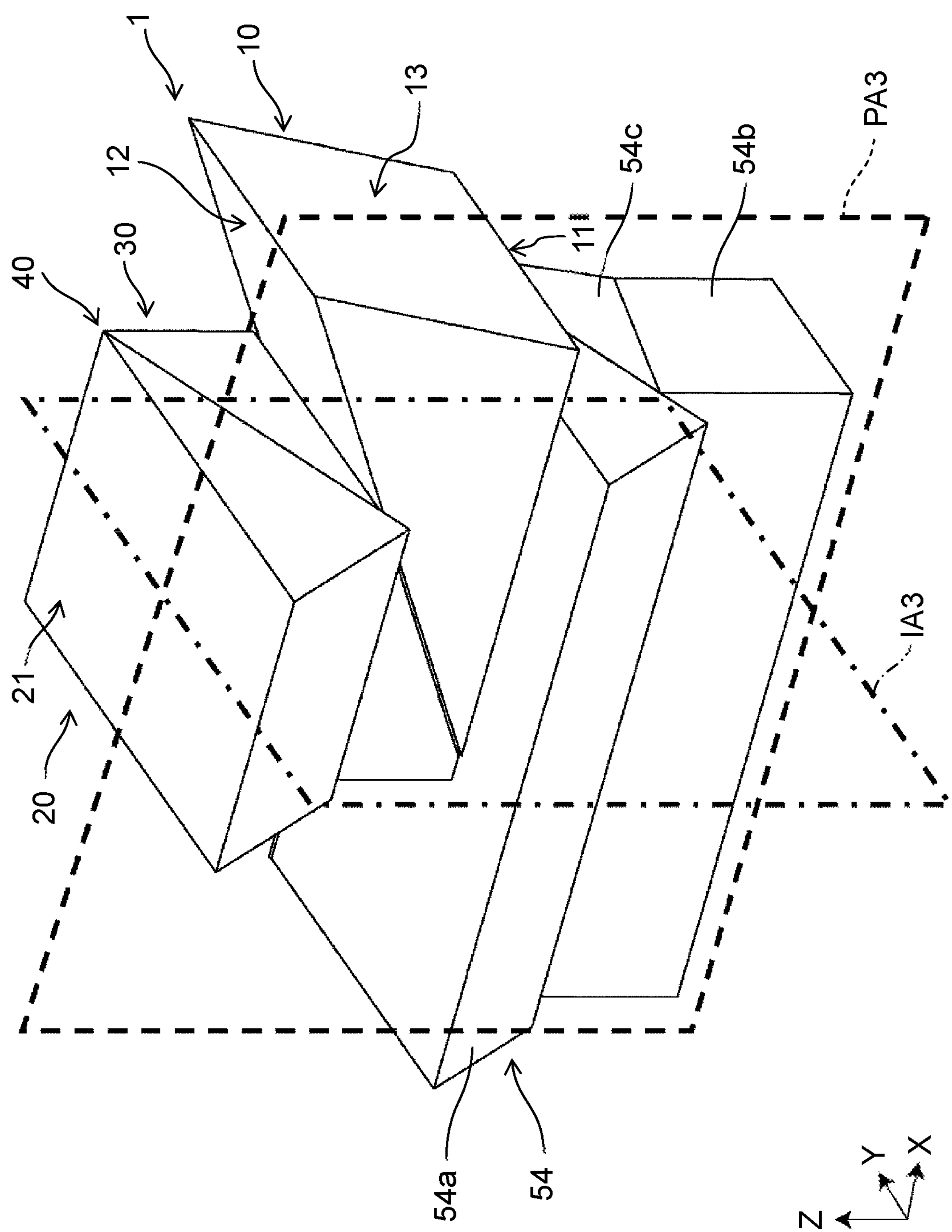
FIG. 12 is a perspective view illustrating the prism block and a color separating and combining prism of FIG. 10.

As illustrated in FIGS. 10 to 12, projection display apparatus 300A includes prism block 1, color separating and combining prism 54, light source 100A, three DMDs 51, 52, and 53 as image forming elements, projection lens unit 60, and imaging element 70. Projection display apparatus 300A is a device that projects an image on screen 200 and captures the image projected on screen 200. In projection display apparatus 300A, after white illumination light Ln5 from light source 100A is incident on third surface 13 of first prism 10, the white illumination light is separated into red light, green light, and blue light by first to third blocks 54*a*, 54*b*, and 54*c* constituting color separating and combining prism 54. Red light is reflected by DMD 53, green light is reflected by DMD 52, and blue light is reflected by DMD 51. Projection light Pn3 reflected by DMDs 51 to 53 is incident on first surface 11 of first prism 10 of prism block 1 again via color separating and combining prism 54, and is emitted from fourth surface 21 of second prism 20 to projection lens unit 60 via third prism 30.

In light source 100A, light is emitted from semiconductor lasers 201A and 201B. For example, semiconductor lasers 201A and 201B emit blue light with a wavelength of 456 nm as a center. A polarization state of the light emitted from semiconductor lasers 201A and 201B is aligned to be P-polarization.

The blue light emitted from semiconductor laser 201A is transmitted through convex lens 202A and concave lens 203A, and passes through diffuser plate 204A. Convex lens 202A and concave lens 203A are afocal lenses that re-collimate light emitted from semiconductor laser 201A. The light having passed through diffuser plate 204A passes through convex lens 202A and concave lens 203A, is formed into collimated light having a desired light beam width, passes through diffuser plate 204A, and reaches dichroic mirror 209A.

Dichroic mirror 209A has characteristics of transmitting P-polarized blue light. Thus, the P-polarized blue light emitted from semiconductor laser 201A is transmitted through dichroic mirror 209A, is transmitted through condenser lenses 206 and 207, and is substantially formed as an image on phosphor wheel 208A while being gradually concentrated.

Phosphor wheel 208A is formed by, for example, providing a phosphor layer on a surface of a circular aluminum substrate. A rotation motor is disposed at a central portion of the aluminum substrate, and can rotate phosphor wheel 208A. For example, the phosphor layer is excited by blue light, and is formed by applying a YAG phosphor that emits yellow light containing green and red wavelength components. The light substantially formed as the image by the phosphor layer of phosphor wheel 208A is reflected as yellow light. By the rotation of phosphor wheel 208A, yellow light is continuously emitted from phosphor wheel 208A.

The yellow light reflected by phosphor wheel 208A is transmitted through condenser lenses 206 and 207, is reflected by dichroic mirror 209A, is transmitted through condenser lens 210, and is incident on rod integrator 212.

On the other hand, the blue light emitted from semiconductor laser 201B is transmitted through convex lens 202B and concave lens 203B, and passes through diffuser plate 204B. Convex lens 202B and concave lens 203B are afocal lenses that re-collimate light emitted from semiconductor laser 201B. The blue light transmitted through diffuser plate 204B passes through convex lens 202B and concave lens 203B, is formed into collimated light having a desired light beam width, passes through diffuser plate 204B, is reflected by mirror 216, and reaches dichroic mirror 209A.

P-polarized blue light emitted from semiconductor laser 201B is transmitted through dichroic mirror 209 A, combined with yellow light reflected by dichroic mirror 209A, transmitted through condenser lens 210, and incident on rod integrator 212.

The light incident on rod integrator 212 is incident, as illumination light Ln5, on prism block 1 via relay optical systems 213, 214, and 215.

As illustrated in FIG. 10, illumination light Ln6 (DMD-OFF light) that is not projected as an image is not incident on projection lens unit 60, but is transmitted through prism block 1.

As in the first exemplary embodiment, imaging light Sn3 including projection light Pn1 reflected by screen 200 is incident on prism block 1, is reflected inside prism block 1, and is received by imaging element 70 as illustrated in FIG. 11. In projection display apparatus 300A, since prism block 1 is disposed closer to projection lens unit 60 than color separating and combining prism 54 is, imaging light Sn3 can be taken into imaging element 70. In the present exemplary embodiment, a prism optical path length of projection light Pn3 from DMD 51, DMD 52, and DMD 53 to projection lens unit 60 is longer than an optical path length of projection light Pn1 (see FIG. 1) of the first exemplary embodiment. Thus, as illustrated in FIG. 11, optical systems 71 and 72 are arranged between second prism 20 and imaging element 70 to adjust an optical path length of imaging light Sn3 up to imaging element 70.

In the present exemplary embodiment, as in the first exemplary embodiment, projection axis plane PA3 and imaging axis plane IA3 intersect each other (see FIG. 12).

In projection display apparatus 300A, the case where prism block 1 described in the first exemplary embodiment is used has been described, but prism block 1A described in the second exemplary embodiment may be used instead of prism block 1.

Other Exemplary Embodiments

As described above, the above exemplary embodiments have been described as examples of the techniques disclosed in the present application. However, the techniques in the present disclosure are not limited to the above exemplary embodiments, and can also be applied to exemplary embodiments in which change, substitution, addition, omission, and the like are performed. In addition, a new exemplary embodiment can be made by combining the components described in the above exemplary embodiments.

In the above-described exemplary embodiments, first prism 10 and second prism 20 have the triangular prism shape, but the shapes of first prism 10 and second prism 20 are not limited to the triangular prism shape.

As described above, the exemplary embodiments have been described as examples of the techniques in the present disclosure. For that purpose, the accompanying drawings and the detailed description have been provided. Therefore, in order to illustrate the above techniques, the components described in the accompanying drawings and the detailed description can include not only components essential to solve a problem but also components not essential to solve a problem. Accordingly, when those non-essential components are described in the accompanying drawings and detailed description, the non-essential components should not be immediately acknowledged to be essential based on only the description.

In addition, because the above exemplary embodiments are for illustrating the techniques in the present disclosure, various modifications, replacements, additions, omissions, or the like can be made without departing from the scope of the accompanying claims or the equivalent thereof.

Outline of Exemplary Embodiment (1) A prism block of the present disclosure includes a first prism that has a first surface, a second surface inclined with respect to the first surface, and a third surface connecting the first surface and the second surface, a second prism that is located on a side of the second surface of the first prism, and has a fourth surface parallel to the first surface, a fifth surface that is located on the side of the second surface with respect to the fourth surface, and is inclined in a direction different from an inclined direction of the second surface with respect to the first surface, and a sixth surface connecting the fourth surface and the fifth surface, a third prism that has a seventh surface facing the second surface via a gap and an eighth surface facing the fifth surface, and is located between the first prism and the second prism, and an optical path separation coating that is located between the fifth surface of the second prism and the eighth surface of the third prism, wherein illumination light incident on the third surface of the first prism is reflected by the second surface, and is emitted from the first surface, projection light incident on the first surface of the first prism is emitted from the fourth surface of the second prism via the third prism, imaging light incident on the fourth surface of the second prism is reflected by the optical path separation coating, and is emitted from the sixth surface, and a projection axis plane including optical paths of the illumination light and the projection light through which the illumination light and the projection light are incident on the first prism and are emitted from the second prism, and an imaging axis plane including an optical path of the imaging light through which the imaging light is incident on the fourth surface of the second prism and is emitted from the sixth surface intersect each other.

With such a configuration, since the optical path of the illumination light and the optical path of the imaging light can be separated, the stray light to the imaging element can be reduced.

(2) In the prism block of (1), the projection axis plane and the imaging axis plane are perpendicular to each other.

With such a configuration, the attenuation effect of the stray light can be enhanced.

(3) In the prism block of (1) or (2), the illumination light is incident on the third surface of the first prism, is reflected by the second surface, is emitted from the first surface, and reaches an imaging forming element that generates an image, the projection light is the illumination light reflected by the image forming element, and is incident on the first surface of the first prism, is emitted from the fourth surface of the second prism via the third prism, and is projected on a projection target via a projection lens unit, and the imaging light includes the projection light reflected by the projection target, and is incident on the fourth surface of the second prism via the projection lens unit, is reflected by the optical path separation coating, is emitted from the sixth surface, and is received by an imaging element disposed on a side of the sixth surface.

With such a configuration, it is possible to separate the optical paths of the illumination light and the projection light and the optical path of the imaging light, and thus, it is possible to increase the amount of light of the illumination light projected on the projection target without attenuating the illumination light by the optical path separation coating.

(4) In the prism block of any one of (1) to (3), when three directions perpendicular to each other are an X direction, a Y direction, and a Z direction, the first surface is positioned on an XY plane extending a +X direction and a +Y direction, the second surface is inclined in a +Z direction with respect to the first surface and is positioned on an inclined plane extending between the +X direction and the +Z direction, the fourth surface is positioned in the +Z direction from the first surface and is positioned on a plane parallel to the first surface, and the fifth surface is inclined in a −Z direction with respect to the fourth surface and is positioned on an inclined plane extending between a −Y direction and the −Z direction.

With such a configuration, since the optical path of the illumination light and the optical path of the imaging light can be separated, the stray light to the imaging element can be reduced.

(5) In the prism block of any one of (1) to (4), the gap between the second surface and the seventh surface is from 3 μm to 10 μm inclusive.

With such a configuration, a probability that the illumination light incident on the third surface of the first prism is totally reflected by the second surface increases, and the stray light incident on the imaging element can be reduced.

(6) In the prism block of any one of (1) to (5), the optical path separation coating transmits light in a first polarization state of one of P-polarization and S-polarization, and reflects light in a second polarization state of another of the P-polarization and the S-polarization.

With such a configuration, since the polarization state can be changed between the illumination light and the imaging light, the stray light incident on the imaging element can be reduced.

(7) In the prism block of any one of (1) to (5), the optical path separation coating is a partial reflection mirror that reflects a part of light.

With such a configuration, the illumination light is not attenuated, the projection light can be transmitted through the optical path separation coating, and the imaging light can be reflected by the optical path separation coating. Accordingly, the optical paths of the illumination light and the imaging light can be separated.

(8) A projection display apparatus of the present disclosure includes the prism block of any one of (1) to (7), a light source that is disposed on a side of the third surface of the first prism, and emits the illumination light, an image forming element that is disposed on a side of the first surface of the first prism, and generates an image, a projection lens unit that is disposed on a side of the fourth surface of the second prism, and an imaging element that is disposed on a side of the sixth surface of the second prism, and captures the imaging light.

With such a configuration, since the function of the TIR prism and the function of the optical path separation prism can be achieved by one prism block, the projection display apparatus can be downsized.

(9) In the projection display apparatus of (8), the image forming element includes a single digital micromirror device (DMD).

With such a configuration, it is possible to provide a small projection display apparatus that prevents the stray light from entering the imaging element.

(10) In the projection display apparatus of (8), the image forming element includes three digital micromirror devices (DMDs) that modulate red, green, and blue light rays, respectively.

With such a configuration, it is possible to provide a small projection display apparatus that prevents the stray light from entering the imaging element.

The present disclosure is applicable to a projection display apparatus that projects an image.

What is claimed is:

1. A prism block comprising:

a first prism that has a first surface, a second surface inclined with respect to the first surface, and a third surface connecting the first surface and the second surface;

a second prism that is located on a side of the second surface of the first prism, and has a fourth surface parallel to the first surface, a fifth surface that is located on the side of the second surface with respect to the fourth surface, and is inclined in a direction different from an inclined direction of the second surface with respect to the first surface, and a sixth surface connecting the fourth surface and the fifth surface;

a third prism that has a seventh surface facing the second surface via a gap and an eighth surface facing the fifth surface, and is located between the first prism and the second prism; and an optical path separation coating that is located between the fifth surface of the second prism and the eighth surface of the third prism, wherein illumination light incident on the third surface of the first prism is reflected by the second surface, and is emitted from the first surface, projection light incident on the first surface of the first prism is emitted from the fourth surface of the second prism via the third prism, imaging light incident on the fourth surface of the second prism is reflected by the optical path separation coating, and is emitted from the sixth surface, and the imaging light includes the projection light reflected by a projection target, and is incident on the fourth surface of the second prism via a projection lens unit, is reflected by the optical path separation coating, is emitted from the sixth surface, and is received by an imaging element disposed on a side of the sixth surface.

2. The prism block according to claim 1, wherein the illumination light is incident on the third surface of the first prism, is reflected by the second surface, is emitted from the first surface, and reaches an image forming element that generates an image, and the projection light is the illumination light reflected by the image forming element, and is incident on the first surface of the first prism, is emitted from the fourth surface of the second prism via the third prism, and is projected on the projection target via the projection lens unit.

3. The prism block according to claim 1, wherein when three directions perpendicular to each other are an X direction, a Y direction, and a Z direction, the first surface is positioned on an XY plane extending a +X direction and a +Y direction, the second surface is inclined in a +Z direction with respect to the first surface and is positioned on an inclined plane extending between the +X direction and the +Z direction, the fourth surface is positioned in the +Z direction from the first surface and is positioned on a plane parallel to the first surface, and the fifth surface is inclined in a −Z direction with respect to the fourth surface and is positioned on an inclined plane extending between a −Y direction and the −Z direction.

4. The prism block according to claim 1, wherein the gap between the second surface and the seventh surface is from 3 μm to 10 μm inclusive.

5. The prism block according to claim 1, wherein the optical path separation coating transmits light in a first polarization state of one of P-polarization and S-polarization, and reflects light in a second polarization state of another of the P-polarization and the S-polarization.

6. The prism block according to claim 1, wherein the optical path separation coating is a partial reflection mirror that reflects a part of light.

7. A projection display apparatus comprising:

the prism block according to claim 1;

a light source that is disposed on a side of the third surface of the first prism, and emits the illumination light;

an image forming element that is disposed on a side of the first surface of the first prism, and generates an image;

the projection lens unit, the projection lens unit being disposed on a side of the fourth surface of the second prism; and the imaging element, the imaging element being disposed on a side of the sixth surface of the second prism, and captures the imaging light.

8. The projection display apparatus according to claim 7, wherein the image forming element includes a single digital micromirror device (DMD).

9. The projection display apparatus according to claim 7, wherein the image forming element includes three digital micromirror devices (DMDs) that modulate red, green, and blue light rays, respectively.

10. The prism block according to claim 1, wherein a projection axis plane including optical paths of the illumination light and the projection light through which the illumination light and the projection light are incident on the first prism and are emitted from the second prism, and an imaging axis plane including an optical path of the imaging light through which the imaging light is incident on the fourth surface of the second prism and is emitted from the sixth surface intersect each other.

11. The prism block according to claim 10, wherein the projection axis plane and the imaging axis plane are perpendicular to each other.

12. A prism block comprising:

a first prism that has a first surface, a second surface inclined with respect to the first surface, and a third surface connecting the first surface and the second surface;

a second prism that is located on a side of the second surface of the first prism, and has a fourth surface parallel to the first surface, a fifth surface that is located on the side of the second surface with respect to the fourth surface, and is inclined in a direction different from an inclined direction of the second surface with respect to the first surface, and a sixth surface connecting the fourth surface and the fifth surface;

a third prism that has a seventh surface facing the second surface via a gap and an eighth surface facing the fifth surface, and is located between the first prism and the second prism; and an optical path separation coating that is located between the fifth surface of the second prism and the eighth surface of the third prism, wherein a light incident on the third surface of the first prism is reflected by the second surface, and is emitted from the first surface, a light incident on the first surface of the first prism is emitted from the fourth surface of the second prism via the third prism, a light incident on the fourth surface of the second prism is reflected by the optical path separation coating, and is emitted from the sixth surface, and the light incident on the fourth surface of the second prism includes light reflected by a projection target, and is incident on the fourth surface of the second prism via a projection lens unit, is reflected by the optical path separation coating, is emitted from the sixth surface, and is received by an imaging element disposed on a side of the sixth surface.

13. A projection display apparatus comprising:

the prism block according to claim 12;

a light source that is disposed on a side of the third surface of the first prism, and emits the light incident on the third surface of the first prism;

an image forming element that is disposed on a side of the first surface of the first prism, and generates an image;

the projection lens unit, the projection lens unit being disposed on a side of the fourth surface of the second prism; and the imaging element, the imaging element being disposed on a side of the sixth surface of the second prism, and captures the light emitted from the sixth surface.

14. The projection display apparatus according to claim 13, wherein the light incident on the third surface of the first prism is illuminating light, the light incident on the first surface of the first prism is projecting light, the light incident on the fourth surface of the second prism is imaging light, and a projection axis plane including optical paths of the illumination light and the projection light through which the illumination light and the projection light are incident on the first prism and are emitted from the second prism, and an imaging axis plane including an optical path of the imaging light through which the imaging light is incident on the fourth surface of the second prism and is emitted from the sixth surface intersect each other.

* * * * *